United States Patent

Lo

[11] Patent Number: 4,982,603
[45] Date of Patent: Jan. 8, 1991

[54] QUALITY ASSURANCE TEST UTILIZING AN AMINO FUNCTIONAL ORGANOSILICON OPTICAL BRIGHTENER

[75] Inventor: Peter Y. K. Lo, Midland, Mich.

[73] Assignee: Dow Corning Corporation, Midland, Mich.

[21] Appl. No.: 305,582

[22] Filed: Feb. 3, 1989

Related U.S. Application Data

[62] Division of Ser. No. 176,967, Apr. 4, 1988, Pat. No. 4,866,152.

[51] Int. Cl.$^5$ .............................................. G01B 21/30
[52] U.S. Cl. .................................... 73/150 R; 356/237
[58] Field of Search ...................... 73/150 R; 356/237; 428/447

[56] References Cited

U.S. PATENT DOCUMENTS

| | | | |
|---|---|---|---|
| 2,949,434 | 8/1960 | Bailey et al. | 528/28 |
| 2,950,986 | 8/1960 | Bailey et al. | 528/25 |
| 2,963,338 | 12/1960 | Bailey et al. | 528/28 |
| 3,427,273 | 2/1969 | Newing | 528/10 |
| 3,741,932 | 6/1973 | Smith | 528/28 |
| 3,888,891 | 6/1975 | Smith et al. | 528/38 |
| 3,930,063 | 12/1975 | Miller et al. | 427/54 |
| 3,956,283 | 5/1976 | Fleck | 544/193.2 |
| 4,595,599 | 6/1986 | Brown et al. | 427/5 |
| 4,712,865 | 12/1987 | Hsu et al. | 350/96.29 |
| 4,714,770 | 12/1987 | Hsu et al. | 556/419 |

*Primary Examiner*—John C. Bleutge
*Assistant Examiner*—R. Dean, Jr.
*Attorney, Agent, or Firm*—Jim L. DeCesare

[57] ABSTRACT

A quality assurance test method utilizing a fluorescent compound formed by reacting at least one aminofunctional organosilicon compound with at least one optical brightener having the formula

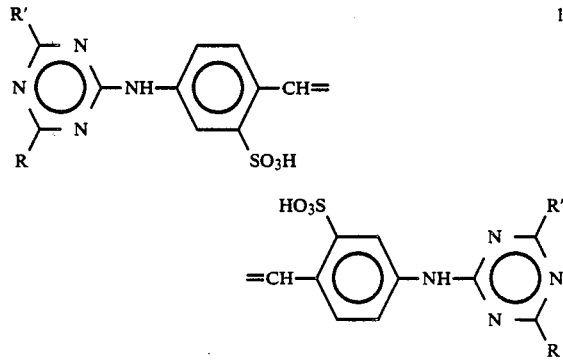

and wherein R denotes anilino,سulfanilic, acid, metanilic acid, or anilin-2,5-disulfonic acid, and R' is methoxy, methylamino, N-methyl-N-hydroxyethylamino, bis(hydroxyethyl)amino, morpholino, anilino, or diethylamino.

The organosilicon fluorescent compound is coated on the substrate and the substrate is placed under an ultraviolet light to check the extensiveness of the coating.

17 Claims, No Drawings

QUALITY ASSURANCE TEST UTILIZING AN AMINO FUNCTIONAL ORGANOSILICON OPTICAL BRIGHTENER

This is a divisional of copending application Ser. No. 07,176,967 filed on April 4, 1988, now U.S. Pat. No. 4,866,152.

BACKGROUND OF THE INVENTION

This invention relates to optical brighteners, and more particularly relates to a fluorescent compound formed by reacting at least one aminofunctional organosilicon compound with at least one optical brightener having the formula

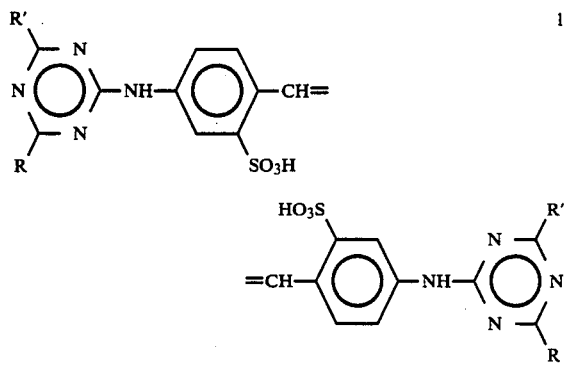

and wherein R denotes anilino, sulfanilic acid, metanilic acid, or anilin-2,5-disulfonic acid, and R' is methoxy, methylamino, N-methyl-N-hydroxyethylamino, bis(hydroxyethyl)amino, morpholino, anilino, or diethylamino.

Brightening is concerned with the preparation of fabrics whose commercial value is dependent on the highest possible whiteness or brightness. It is well known that many substrates possess a yellow cast which may be eliminated by means of blue or blue-violet light. Optical brighteners, termed fluorescent whitening and fluorescent brightening agents, compensate for the yellow cast. Yellow cast is produced by the absorption of short-wavelength light in the violet-to-blue portion of the spectrum. Optical brighteners replace in part this short-wavelength light and a complete white is attained. The brightener produces additional light by means of fluorescence. It absorbs the invisible ultraviolet portion of the daylight spectrum and converts the energy into the longer-wavelength visible portion of the spectrum which is blue to blue-violet light. Thus, an optical brightener absorbs ultraviolet light and remits it in the blue region of the visible spectrum. The human eye is sensitive to a narrow band of radiant energy. However, it is not sensitive to ultraviolet or infrared wavelengths. Therefore, the eye does not respond to all of the radiation from a white surface upon which sunlight is falling. Most of the light is reflected and only radiation in the range of 400 to about 800 mu is sensed by the eye. Optical brighteners do not significantly affect the total radiation reflected by the fabric, however, they do convert absorbed invisible ultraviolet radiation into visible light making the fabric appear whiter and brighter.

The prior art is replete with compounds described as fluorescent, however, only some of these compounds include silicon. For example, in U.S. Pat. No. 4,595,599, issued June 17, 1986, there is described a luminescent compound that is a silane and having incorporated therein cyanine, xanthene, and anthracene, type dye structure moieties. The compounds are said to be useful as highway and roadway markings. In contrast, the compositions of the present invention are aminoalkylfunctional organosilicon compounds, however, the incorporated moiety is an optical brightener with aldehyde or sulfonic acid type functional groupings. The compositions disclosed herein are further useful as additives to laundry detergents and hair dyes. U.S. Pat. No. 3,427,273, issued Feb. 11, 1969, relates to organopolysiloxane compounds that are prepared by the hydrolysis of silanes and are rendered fluorescent by bonding a polynuclear aromatic hydrocarbon substituent directly to the silicon. The compositions are stated to be useful as signs, markers, and dials. While the present invention includes polysiloxanes that are rendered fluorescent, they differ substantially from the compounds in the 273' patent, in that, they are aminoalkylfunctional-type polysiloxanes, and they are rendered fluorescent by bonding an optical brightener substituent having aldehyde or sulfonic acid type functional groupings to the siloxane molecule. As noted above, the compounds of the present invention are useful as additives in laundry detergents and hair dyes. Thus, there is provided herein new categories of fluorescent compositions not known in the prior art.

SUMMARY OF THE INVENTION

This invention relates to a process for preparing fluorescent organosilicon compounds selected from the group consisting of
 (i) fluorescent polysiloxanes and
 (ii) fluorescent silanes;
the process being the steps of
 (I) contacting an aminoalkylfunctional organosilicon compound with a compound selected from the group consisting of
 (i) fluorescent functional organosulfonic acids and
 (ii) fluorescent functional organoaldehydes
 (II) heating the mixture of (I) for a period ranging from 30 minutes to 15 hours at a temperature in the range of 75° C. to 150° C.
 (III) cooling the reaction mixture from (II) and separating the fluorescent organosilicon compound from the reaction mixture;
whereupon a fluorescent organosilicon compound is obtained.

This invention also relates to fluorescent organosilicon compounds derived from the reaction of an aminoalkylfunctional organosilicon compound with a fluorescent functional organosulfonic acid having the general formula

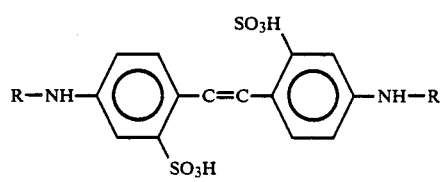

wherein R

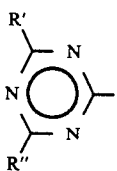

wherein R' is methoxy, methylamino, N-methyl-N-hydroxyethylamino, bis(hydroxyethyl)amino, morpholino, anilino, or diethylamino, and R" denotes anilino, sulfanilic acid, metanilic acid, or anilin-2,5-disulfonic acid.

The invention further relates to fluorescent organosilicon compounds derived from the reaction of an aminoalkylfunctional organosilicon compound with a fluorescent functional organoaldehyde selected from the group consisting of (i)

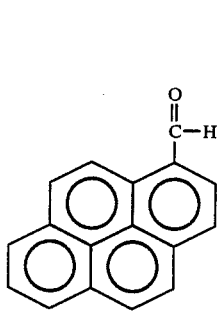

and

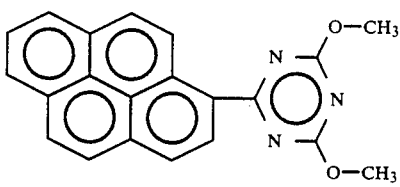

This invention still further relates to a quality assurance test method for indicating the extensiveness of a silicone treatment upon a substance such as paper which is otherwise invisible under normal light conditions including the steps of treating the substrate with one of the foregoing compounds and examining the treated substrate for fluorescence under ultraviolet light.

This invention yet further relates to laundry detergents, hair dye compositions, and curable elastomeric and resinous films, containing such compounds as aforementioned.

This invention also further relates to a fluorescent compound formed by reacting at least one aminofunctional organosilicon compound with at least one aminofunctional organosilicon compound with at least one optical brightener having the formula

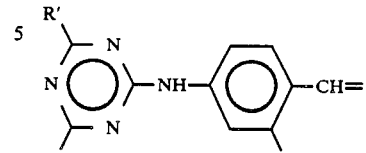

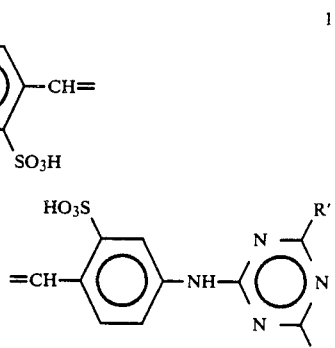

and wherein R denotes anilino, sulfanilic acid, metanilic acid, or anilin-2,5-disulfonic acid, and R' is methoxy, methylamino, N-methyl-N-hydroxyethylamino, bis(hydroxyethyl)amino, morpholino, anilino, or diethylamino.

The preferred optical brightener has the structure identified by Formula 2 as follows:

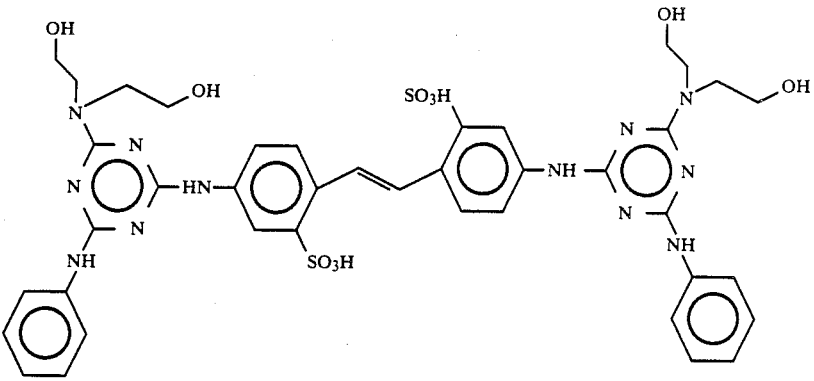

(ii) Some of the preferred aminofunctional organosilicon compounds have the following formulas Me₃SiO(Me₂SiO)₁₈₈(MeSiO)₁₀SiMe₃

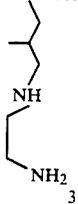

Me₃SiO(Me₂SiO)₉₆(MeSiO)₂SiMe₃

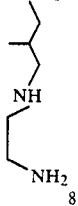

-continued

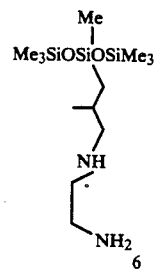

The fluorescent elastomeric film formed of the fluorescent compounds noted above, are formed by reacting the fluorescent compounds with a polyfunctional acrylate such as diethylene glycol diacrylate.

In another embodiment, a fluorescent compound is formed by reacting at least one aminofunctional organosiloxane compound with at least one aldehyde functional optical brightener which is a pyrene derivative. In this embodiment, the preferred organosiloxane is a trisiloxane having the formula

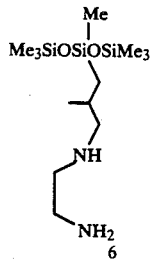

and wherein the preferred optical brightener has the formula

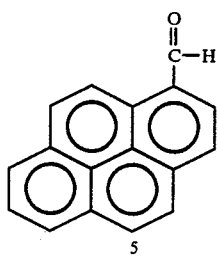

or

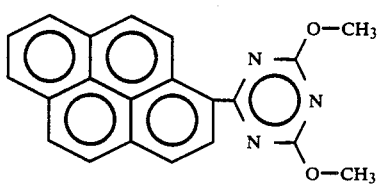

Thus, one compound of the foregoing embodiment relates to an imine produced in accordance with the following scheme

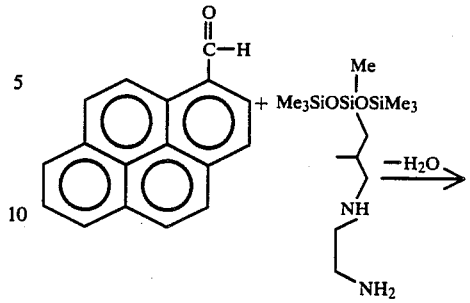

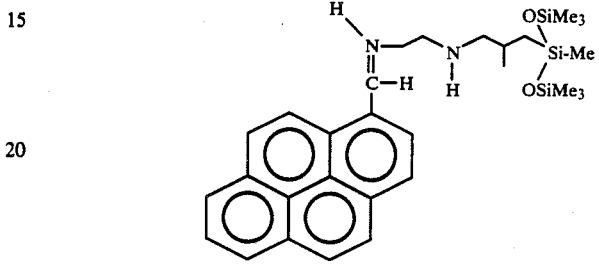

and wherein the optical brightener (5) is 1-pyrenecarboxaldehyde.

In view of the foregoing, it is an object of the present invention to improve optical brightener properties such as fluorescence, exhaustion, efficiency, wash fastness, and stability to sunlight and chlorine bleach, for example.

It is also an object of the present invention to improve optical brightener properties and products by the effect of organofunctional silanes and siloxanes on the products.

It is a further object of the present invention to incorporate silicones in optical brighteners in order to synthesize fluorescent dyes with silicon as an integral part of the structure.

These and other objects, features, and advantages, of the present invention will become apparent from the following detailed description of the invention when taken in conjunction with the several Examples.

DETAILED DESCRIPTION OF THE INVENTION

In accordance with the present invention, aminoalkylfunctional polysiloxanes and silanes are employed in order to react with optical brighteners bearing either sulfonic acid or aldehyde functional groupings. The resulting products so produced are fluorescent polysiloxanes and silanes. In particular, the polysiloxane fluorescent products bear utility as additives for laundry detergents, and as additives for hair dyes, due to their brightening effects. Advantage may also be taken of this fluorescence in the use of the products as a test media for indicating the extensiveness of a silicone treatment upon a substrate such as paper coatings, for example. Thus, the fluorescence of these compounds provides evidence under ultraviolet radiation for silicone treatment upon a given substrate but which is otherwise invisible under normal visible light conditions. The fluorescent silanes as indicated by Formula (4) also cure to a tack free resinous fluorescent film upon exposure of these compounds to moisture. On the other hand the fluorescent polysiloxane compounds of the present invention, when containing excess amine functional groupings, may be cured to elastomeric fluorescent films by reacting the compound with a crosslinking agent that is a polyfunctional acrylate.

As noted previously, optical brighteners or fluorescent whitening agents absorb invisible ultraviolet light and convert that energy into the longer wavelength and visible portion of the spectrum, that is the blue-violet region. Because of this phenomenon, advantage can be taken of the compounds of the present invention in their use in laundry detergents to attain whitening effects. The compounds include sulfonic acid functional groups, and the actual fluorescent moieties are the stilbene and pyrene portions of the molecule. The sulfonic acid portion increases the aqueous solubility of the molecule.

In the Examples shown below, aminofunctional fluids such as illustrated by Formula (3) are mixed with compounds typified by Formula (1) and heated yielding products which when placed under ultraviolet radiation fluoresce in the blue region.

Organopolysiloxanes useful in this invention are amine-functional organopolysiloxanes which consist of a plurality of organosiloxane units of the general formula

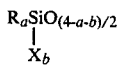

wherein X is a reactive amine-functional organic group bearing at least one —NHR″ group, in which R″ is hydrogen or an alkyl radical having 1 to 6 carbon atoms. On average, at least two reactive X groups per molecule of organopolysiloxane are required to be within the scope of the present invention.

In the above formula, R is a non-reactive group which may be independently selected from alkyl radicals having 1 to 6 carbon atoms, such as methyl, ethyl, propyl, butyl, isopropyl or hexyl. The R group may also be selected from cycloaliphatic radicals, such as cyclopentyl, cyclohexyl and cyclooctyl radicals. Alternatively, R can be an aryl group such as phenyl, benzyl, styryl, tolyl and xenyl. Still further, R may be a monovalent halohydrocarbyl group having 1 to 6 carbon atoms such as 3,3,3 -trifluoropropyl, 3-chloropropyl and perfluorobutylethyl. Finally, R may be a haloaromatic group, such as 2,3-dichlorophenyl. It is preferred that R is selected from methyl, phenyl or 3,3,3.trifluoropropyl radicals. In any given organosiloxane unit, the value of a may be 0, 1, 2 or 3, the value of b may be 0, 1 or 2 and the sum (a+b) is less than 4.

In a preferred embodiment of this invention, the X group is —R′(NHCH₂CH₂)ₘNR″H. In this embodiment, R′ is a divalent hydrocarbyl group having from 3 to 6 carbon atoms such as trimethylene, tetramethylene and isobutylene. Preferably, R′ is trimethylene or isobutylene. R″ is hydrogen or an alkyl radical having from 1 to 6 carbon atoms, preferably hydrogen, and g is an integer having a value between zero and 4. Preferably g is one.

It is further preferred that the amine-functional organopolysiloxane be a linear copolymer selected from structures which may be represented by the average formulae R₃SiO(R₂SiO)ₓ(RSiO)ᵧSiR₃ or
 |
 X -continued

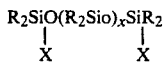

wherein the R groups are independently selected from non-reactive species, the average value of x may vary from zero to about 900 and the average value of y may vary from 2 to about 100. It is also preferred that the R groups are methyl radicals and X is —R′(NHCH₂CH₂)ₘNR″H, as defined above. In these embodiments, particularly preferred X groups are

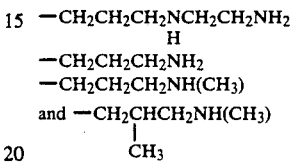

while the most preferred X group is X′, which may be represented by the formula

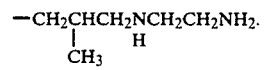

The most preferred amine-functional organopolysiloxanes have the structure

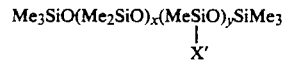

wherein X′ has been defined and Me hereinafter denotes the methyl radical. In this case, x represents the average number of dimethyl units and can range from zero to 900, preferably from 50 to 400. Likewise, y represents the average number of methyl-aminofunctional units and can range from 2 to about 100, preferably from 2 to 30. These amine-functional siloxanes are fluids having a viscosity between about 50 and 2000 cP at 25° C.

The compounds of Formulas (1) and (2) can also be reacted with silane fluids typically of the category shown in Formula (4), and when heated together provide fluorescent solutions which when exposed to moisture render a fluorescent film also active in the blue region of the spectrum. Reaction products of compounds of Formulas (2) and (3) render reactive amine fluids having excess amine sites. Such fluids it has been determined, are further capable of reacting with polyacrylates such as diethylene glycol diacrylate in a Michael Addition reaction to yield under sunlight or ultraviolet light fluorescent elastomeric films.

The hazy crude sulfonamide products produced in Examples I to VII and IX were formed generally in accordance with the following reaction scheme:

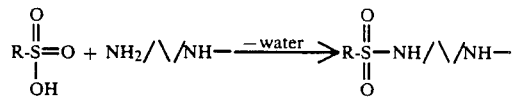

The yield of such sulfonamide products can be maximized via an intermediate procedure as follows:

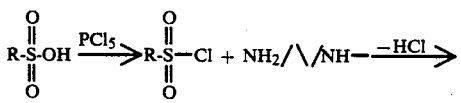

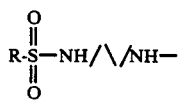

The fluorescent polydimethylsiloxane compounds of the present invention can also be prepared using other types of reactions, for example, in Formula (5) 1-pyrenecarboxaldehyde when reacted with a trisiloxane as shown in Formula (6) provides an imine product shown in Formula (7), which imine product is fluorescent in the blue-green region of the spectrum.

The invention is further illustrated by the following examples.

EXAMPLE I

Into a reaction flask was added 100 grams of the compound of Formula 3, together with one gram of the compound of Formula 2. The reaction mixture was stirred magnetically, and then heated to about 95 degrees centigrade for two and one half hours while being maintained under a nitrogen atmosphere. A hazy crude product resulted, and the product was cooled to room temperature and dissolved in twenty milliliters of toluene. The solution was dried employing sodium sulfate and concentrated to provide a product of a fluorescent polysiloxane fluid.

EXAMPLE II

Into a reaction flask was added 100 grams of the compound of Formula 3, together with two grams of the compound of Formula 2. The reaction mixture was stirred magnetically, and then heated to about 95 degrees centigrade for two and one half hours while being maintained under a nitrogen atmosphere. A hazy crude product resulted, and the product was cooled to room temperature and dissolved in twenty milliliters of toluene. The solution was dried employing sodium sulfate and concentrated to provide a product of a fluorescent polysiloxane fluid. The fluid was fluorescent in the blue region under wavelengths of 254 and 265.

EXAMPLE III

Into a reaction flask was added 20 grams of the trisiloxane compound of Formula 6, together with two-tenths of a gram of the compound of Formula 2. The reaction mixture was stirred magnetically, and then heated to about 90 degrees centigrade for two and one half hours while being maintained under a nitrogen atmosphere. A clear solution resulted, and the solution was cooled to room temperature and dissolved in twenty milliliters of toluene. The solution was dried employing sodium sulfate and concentrated to provide a product of a fluorescent siloxane fluid. The fluid was also fluorescent in the blue region.

EXAMPLE IV

Into a reaction flask was added 250 grams of the compound of Formula 8, together with five grams of the compound of Formula 2. The reaction mixture was stirred magnetically, and then heated to about 120 degrees centigrade for seven hours while being maintained under a nitrogen atmosphere. A crude product resulted, and the product was cooled to room temperature and mixed with 100 grams of toluene. The solution was dried by the azeotropic removal of water and concentrated by means of rotary evaporation to provide a product of a fluorescent polysiloxane fluid.

EXAMPLE V

Into a reaction flask was added 250 grams of a polysiloxane compound having a dp of 50 and being 4.5 mole % aminoalkylfunctional, together with five grams of the compound of Formula 2. The reaction mixture was stirred magnetically, and then heated to about 130 degrees centigrade for five hours while being maintained under a nitrogen atmosphere. A crude product resulted, and the product was cooled to room temperature and mixed with 100 grams of toluene. The solution was dried by employing sodium sulfate, concentrated by means of rotary evaporation, and filtered to provide a clear fluorescent polysiloxane fluid.

EXAMPLE VI

Into a reaction flask was added 250 grams of a polysiloxane compound having a dp of 400 and being 5 mole % aminofunctional, together with five grams of the compound of Formula 2. The reaction mixture was stirred magnetically, and then heated to about 120 degrees centigrade for 15 hours while being maintained under a nitrogen atmosphere. A crude product resulted, and the product was cooled to room temperature and mixed with 200 milliliters of toluene. The solution was dried employing sodium sulfate, concentrated by means of rotary evaporation, and a yellowish fluorescent polysiloxane fluid was obtained which fluoresced in the blue region.

EXAMPLE VII

Into a reaction flask was added 51 grams of the silane compound of Formula 4, together with one-half gram of the compound of Formula 2. The reaction mixture was stirred magnetically, and then heated to about 95 degrees centigrade for two and one half hours while being maintained under a nitrogen atmosphere. A clear solution resulted, and the product was cooled to room temperature and dissolved in twenty milliliters of toluene. The solution was dried employing sodium sulfate and concentrated. A sample of the solution was placed on a microscopic slide and exposed to moisture. A tack free film was obtained which fluoresced in the blue region.

EXAMPLE VIII

Into a reaction flask was added 10 grams of the trisiloxane compound of Formula 6, together with one-tenth gram of the optical brightener compound of Formula 5 being 1-pyrenecarboxaldehyde. The reaction mixture was stirred magnetically, and then heated to about 90 degrees centigrade for thirty minutes while being maintained under a nitrogen atmosphere. A hazy solution resulted and the product was cooled to room temperature and dissolved in toluene. The solution was dried employing sodium sulfate and concentrated to provide a clear solution of the structure represented by Formula 7. The solution fluoresced in the blue-green region under 365 nm radiation.

EXAMPLE IX

Into a reaction flask was added 100 grams of the compound of Formula 3, together with two grams of the compound of Formula 2. The reaction mixture was stirred magnetically, and then heated to about 95 degrees centigrade for two and one half hours while being maintained under a nitrogen atmosphere. A hazy crude product resulted, and the product was cooled to room temperature and dissolved in twenty milliliters of toluene. The solution was dried employing sodium sulfate and concentrated to provide a product of a fluorescent polysiloxane fluid. The fluid was fluorescent in the blue region under wavelengths of 254 and 265. A sample of the fluid in the amount of 0.16 grams was mixed with 0.1 grams of diethylene glycol diacrylate. The mixture was found to be murky, but when poured onto a microscopic slide and permitted to react at room temperature for seventeen hours, a tack-free transparent, fluorescent film was obtained.

While Example VII specifies a silane of the type shown by Formula (4), it is to be understood that other organofunctional silanes may be employed. For example, silanes of the following formulas have been found to be useful in accordance with the present invention:

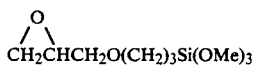

and

Typical of the types of brightening agents covered by the present invention include, for example, stilbene derivatives such as 4,4′bis(triazin-2-ylamino)stilbene2,2′-disulfonic acids; mono(azol-2-yl)stilbenes such as 2-(stilben-4-yl)naphthotriazoles, and 2-(4-phenylstilben-4-yl)benzoxazoles; bis(azol-2-yl)stilbenes such as 4,4′-bis(triazol-2-yl)stilbene-2,2′-disulfonic acids; styryl derivatives of benzene and biphenyl such as 1,4-bis(-styryl)benzenes, and 4,4′-bis(styryl)biphenyls; pyrazolines such as 1,3 -diphenyl-2-pryazolines; bis(benzazol-2-yl) derivatives; bis(benzoxazol-2-yl) derivatives; bis(-benzimidazol-2-yl) derivatives; 2-(benzofuran-2-yl)benzimidazoles; coumarins such as 7-hydroxy and 7-(substituted amino)coumarins including 3-phenyl-7-(triazin-2-ylamino)coumarins; carbostyrils; naphthalimides; derivatives of dibenzothiophene-5,5-dioxide; pyrene derivatives; and pyridotriazoles.

The compounds of the present invention are useful in the textile industry, the detergent industry as noted previously, the paper industry, and in the synthetic fibers and plastics industry. They are particularly applicable to natural and synthetic fibers such as wool, cotton, and polyamide fibers. In the detergent field, they are particularly successful on cellulosic substrates as well as wool. Papers can be whitened by addition of the compounds to the pulp and to the surface as a coating, or to the preformed sheet to provide surface whiteness. The compounds disclosed herein show excellent stability to hypochlorite bleach. The sunlight stability of the compounds is considerably beyond that of known and conventional optical brightening agents. In addition, the compounds exhibit excellent cold water and warm water behavior patterns as compared to those compositions existing in the prior art.

It will be apparent from the foregoing that many other variations and modifications may be made in the structures, compounds, compositions, and methods described herein without departing substantially from the essential concepts of the present invention. Accordingly, it should be clearly understood that the forms of the invention described herein are exemplary only and are not intended as limitations on the scope of the present invention.

What is claimed is:

1. A quality assurance test method for indicating the extensiveness of a silicone treatment upon a substrate, which treatment is otherwise invisible under normal light conditions, comprising the steps of treating the substrate with a fluorescent compound derived from the reaction of an aminofunctional organosilicon compound selected from the group consisting of polysiloxane and silanes, with a compound selected from the group consisting of fluorescent functional organosulfonic acids and fluorescent functional organoaldehydes, and examining the treated substrate for fluorescence under ultraviolet light.

2. The method of claim 1 wherein the substrate in paper.

3. The method of claim 1 wherein the fluorescent compound is derived from the reaction of an aminoalkylfunctional organosilicon compound with a fluorescent functional organosulfonic acid having the general formula

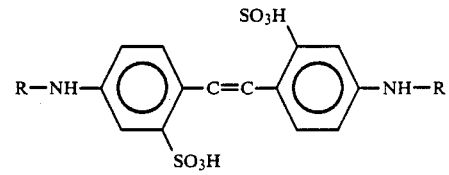

wherein R is

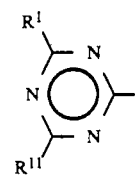

wherein R′ is methoxy, methylamino, N-methyl-N-hydroxyethylamino, bis(hydroxyethyl)amino, morpholino, anilino, or diethylamino, and R″ denotes anilino, sulfanilic acid, metanilic acid, or anilin-2,5-disulfonic acid.

4. The method of claim 1 wherein the fluorescent compound is derived from the reaction of an aminoalkylfunctional organosilicon compound with a fluorescent functional organoaldehyde of the formula

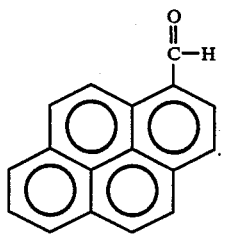

5. A quality assurance test method for indicating the extensiveness of a silicone treatment upon a substrate, which treatment is otherwise invisible under normal light conditions, comprising the steps of treating the substrate with fluorescent compound derived from the reaction of an aminofunctional organosilicon compound selected from the group consisting of polysiloxanes and silanes, with a compound which is a fluorescent functional organosulfonic acid, and examining the treated substrate for fluorescence under ultraviolet light.

6. The method of claim 5 wherein the substrate is paper.

7. The method of claim wherein the fluorescent compound is derived from the reaction of at least one aminofunctional organosilicon compound and at least one optical brightener having the formula

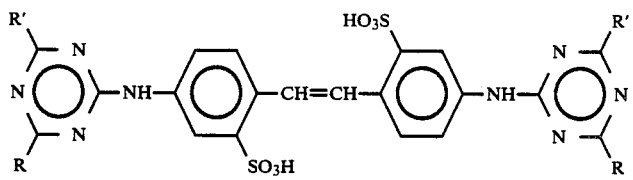

and wherein R denotes anilino, sulfanilic acid, metanilic acid, or anilin-2,5-disulfonic acid, and R' is methoxy, methylamino, N-methyl-N-hydroxyethylamino, bis(hydroxyethyl)amino, morpholino, anilino, or diethylamino.

8. The method of claim 7 wherein the aminofunctional organosilicon compound is an organopolysiloxane of the formula Me₃SiO(Me₂SiO)₁₈₈(MeSiO)₁₀SiMe₃.

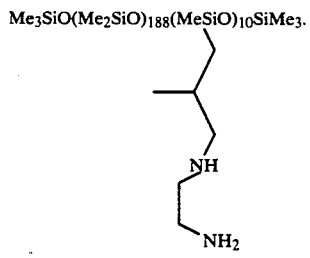

9. The method of claim 7 wherein the aminofunctional organosilicon compound is an organopolysiloxane of the formula Me₃SiO(Me₂SiO)₉₆(MeSiO)₂SiMe₃.

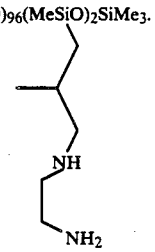

10. The method of claim 7 wherein the aminofunctional organosilicon compound is an organopolysiloxane of the formula Me₃SiOSiOSiMe₃.
        |
        Me

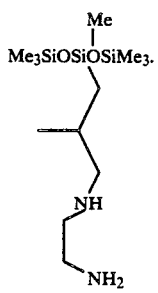

11. The method of claim 7 wherein the aminofunctional organosilicon compound is an organopolysiloxane of the formula H₂NCH₂CH₂NH(CH₂)₃Si(OMe)₃.

12. A quality assurance test method for indicating the extensiveness of a silicone treatment upon a substrate, which treatment is otherwise invisible under normal light conditions, comprising the steps of treating the substrate with a fluorescent compound derived from the reaction of an aminofunctional organosilicon compound selected from the group consisting of polysiloxanes and silanes, with a compound which is a fluorescent functional organoaldehyde, and examining the treated substrate for fluorescence under ultraviolet light.

13. The method of claim 12 wherein the substrate is paper.

14. The method of claim 12 wherein the fluorescent compound is derived from the reaction of at least one aminofunctional organosiloxane compound and at least one aldehyde functional optical brightener which is a pyrene derivative.

15. The method of claim 14 wherein the organosiloxane is an organopolysiloxane having the formula

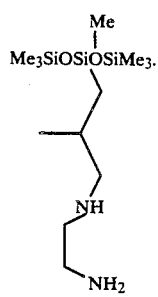
16. The method of claim 15 wherein the optical brightener has the formula
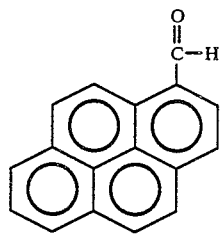
17. The method of claim 16 wherein the optical brightener is 1-pyrenecarboxaldehyde.
* * * * *